United States Patent [19]

Hedinger et al.

[11] 4,261,266

[45] Apr. 14, 1981

[54] EXTENSIBLE TABLE

[75] Inventors: Donald L. Hedinger; Alfred E. Ruckriegel, both of Jasper, Ind.

[73] Assignee: Design Institute America, Montpelier, Ohio

[21] Appl. No.: 38,952

[22] Filed: May 14, 1979

[51] Int. Cl.³ .............................................. A47B 1/04
[52] U.S. Cl. ..................................... 108/69; 108/77; 16/144; 411/517
[58] Field of Search ...................... 108/77, 69; 5/57 B, 5/68; 16/144, 139, 147; 248/407; 85/8.8

[56] References Cited

U.S. PATENT DOCUMENTS

| | | | |
|---|---|---|---|
| 59,365 | 11/1866 | Corington | 16/144 |
| 615,654 | 12/1898 | Mulcahy | 16/144 |
| 818,081 | 4/1906 | Dwyer | 16/144 |
| 987,423 | 3/1911 | Barnett | 5/68 |
| 1,051,144 | 1/1913 | Manny | 248/407 |
| 2,896,287 | 7/1959 | Stultz | 85/8.8 |
| 3,401,436 | 9/1968 | Bradshaw | 85/8.8 |
| 3,992,117 | 11/1976 | Ristau | 85/8.8 |
| 4,109,589 | 8/1978 | Ruckriegel et al. | 108/77 |
| 4,137,603 | 2/1979 | Kvasnes | 16/139 |

Primary Examiner—Francis K. Zugel
Attorney, Agent, or Firm—Reising, Ethington, Barnard, Perry & Brooks

[57] ABSTRACT

An extensible table (10) has one or more pivotal leaves (11) movable between an upper use position and a lower storage position. Each leaf is pivotally supported by a pair of hinges each of which includes a journal (34) which is connected to the pivotal leaf and is received within a journal block (30) formed in the frame of the table. One hinge of each pair is a positioning hinge and the journal thereof has first and second recesses corresponding to the use position and the storage position, respectively. A locking pin (42) disposed in an aperture extending transversely through the journal block of each positioning hinge and engages one of the recesses in the journal when the pivotal leaf is in one position and engages the other of the recesses when the leaf is in the other of its positions. The locking pin also has a recess formed in its shaft which can be oriented to initially register with one of the recesses on the journal to thereupon permit pivotal movement of the end leaf. The journal is secured in the journal bearing by a retaining clip (38) in aligned circumferential grooves in the journal and journal block.

8 Claims, 12 Drawing Figures

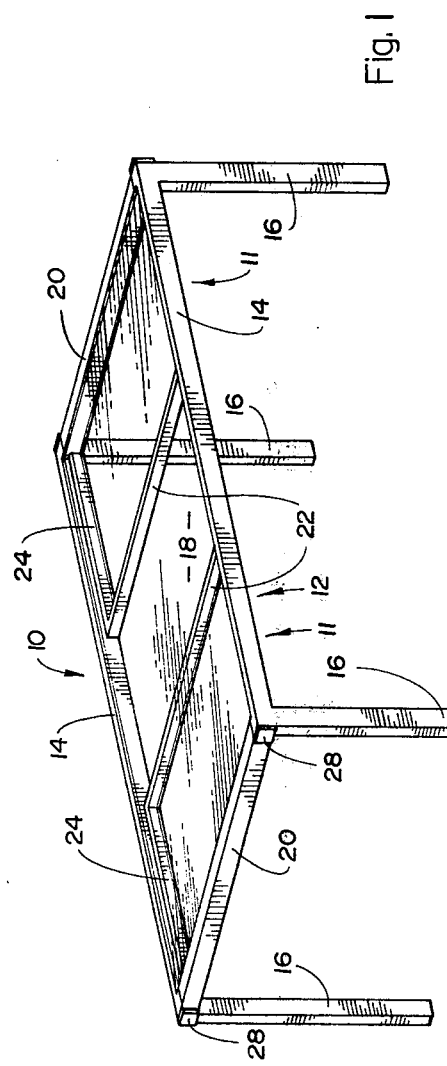
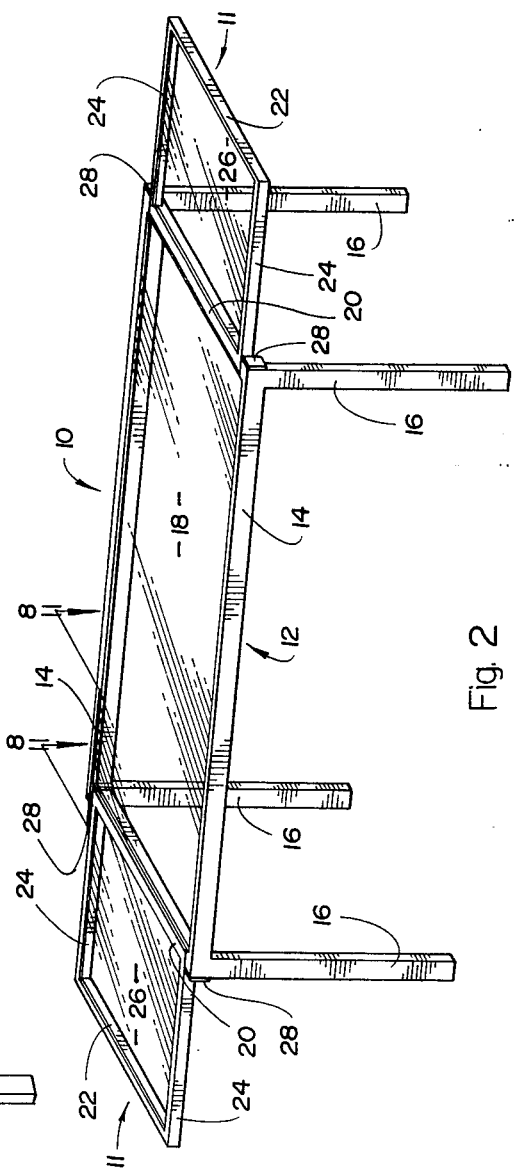

EXTENSIBLE TABLE

TECHNICAL FIELD

This invention relates to a table positioning hinge for maintaining a pivotal table leaf in either a use or storage position and also relates to a table frame member connection that is incorporated in the positioning hinge.

BACKGROUND ART

A pivotal leaf table has the advantage of being variable in size to accommodate different size gatherings or types of use. The table leaves can be placed in a storage position when not needed and pivoted to a use position when it is desired to enlarge the size of the table.

A known form of pivotal leaf table has a horizontal frame usually made of tubular metal so as to define the peripheral shape of the table within which either a transparent or opaque sheet material is received to define the table surface. This type of table has contemporary appeal and is favored in a wide range of modern decors.

In this type of table the hinges which support the table leaves for movement between storage or use positions should be concealed to preserve the aesthetic appearance of the table. In particular, if the table has a transparent inlaid top of glass or plastic sheet material, the hinge must be concealed with respect to both the top and underside of the table to maintain a correct aesthetic appearance.

In U.S. Pat. No. 4,109,589 a glass top table is disclosed with a pivotal end leaf construction. The end leaf may be placed in either a storage position in which it is folded under the central table surface or may be placed in a use position in which the end leaf is extended. In either position of the end leaf the table has an aesthetically appealing appearance unaffected by the presence of the hinge which supports the end leaf even though both the table top and the end leaf are of glass or other transparent material.

In U.S. Pat. No. 4,020,711, a transparent top table is disclosed in which the end sections of the table may be pulled apart and a center section can be rotated 180° from a lowered position to a raised position in which it lies flush with the end sections.

Also, a number of patents disclose tables having rectractable and extensible frames which allow the size of the table to vary. These patents include U.S. Pat. Nos. 3,769,919; 3,974,782; and 3,980,026.

DISCLOSURE OF INVENTION

An object of the present invention is to provide an extensible pivotal leaf table with an improved but simplified positioning hinge that supports and pivotally positions the leaf in either a storage position or use position and which does not detract from the aesthetic appearance of the table in either position even with the table top and leaf made from a transparent material.

The above object and other objects of the present invention are carried out by an extensible pivotal leaf table having at least one leaf that can be moved pivotally in either direction between an upper use position and a lower storage position. The leaf is supported for such movement and selectively maintained in either position by a simplified positioning hinge which is operated by a locking pin.

In overview, the disclosed embodiment includes a table construction in which a pivotal leaf is supported on the frame of the table by a pair of hinges. Each hinge includes a journal which is received within a journal block formed as part of the frame. The journal blocks receive the journals in conjunctive relationship. One hinge of each leaf is a positioning hinge that includes the locking pin for pivotally fixing the journal and block with respect to each other. Generally diametrically opposite recesses of the journal selectively receive the blocking pin which extends from the block in order to locate the leaf in either the use or storage position.

In the preferred form, each journal has a cylindrical shape and includes a pair of chordal recesses oriented in substantially diametric relation. One of the recesses represents the use position of the pivotal leaf, and the other of the recesses represents the storage position of the leaf. The locking pin is received by an aperture extending transversely through the journal block and is also selectively positioned within one of the recesses in the journal to lock the pivotal leaf in either of its positions. The locking pin also includes a recess which can be oriented to permit rotational movement of the pivotal leaf between the use and storage positions.

The locking pin is rotated to align its recess with an adjacent recess on the journal and the journal is thereupon free to pivot within the journal block between positions. On reaching the desired position of the end leaf, the locking pin is again rotated such that the recess on its shaft is brought out of registry with the adjacent recess on the journal. In this orientation, the solid portion of the locking pin engages the adjacent groove on the journal and prevents pivoting of the journal.

A retainer on one end of the locking pin retains the pin within the block. The retainer includes a groove in the pin and a retaining clip received by the groove. A plate on the other end of the pin is oriented normal to the axis thereof and manually grasped to rotate the pin. The plate provides an extension of the block in an aesthetically appealing manner with the leaf held in either position.

A braking mechanism is provided to limit the speed at which the end leaf pivots between positions. The disclosed embodiment of the braking mechanism takes the form of a brass plug inserted into a threaded bore in the journal block. A set screw bears against the brass plug such that the plug engages the journal to provide resistance to pivotal movement of the journal.

In another feature of the invention, perpendicular frame members are secured to each other by a connection that is secured by a retaining clip. Male and female conjuncts on the frame members each include a groove that is aligned with the other groove upon positioning of the male conjunct within the female conjunct. A retaining clip is received by both grooves to retain the male conjunct within the female conjunct.

Each of the leaf hinges preferably incorporates the retaining clip connection with the journal and block respectively embodying the male and female conjuncts. The block extends inwardly from the associated table frame member and leg connected thereby and has a lower opening through which legs of the retaining clip are accessible. During assembly, the clip legs are deflected so the clip is positioned within one of the grooves in order to permit insertion of the journal into the block. Thereafter, the clip legs are released so that the clip is positioned within both grooves in order to prevent withdrawal of the journal.

Other advantages of the present invention will be readily appreciated as the same becomes better understood with reference to the following detailed description when considered in connection with the accompanying drawings.

BRIEF DESCRIPTION OF DRAWINGS

FIG. 1 is a perspective view of an extensible pivotal leaf table embodying the present invention with the pivotal leaves shown in their storage positions;

FIG. 2 is a perspective view of the extensible table of FIG. 1 with the pivotal leaves shown in their use positions;

BEST MODE FOR CARRYING OUT THE INVENTION

Figure 3:
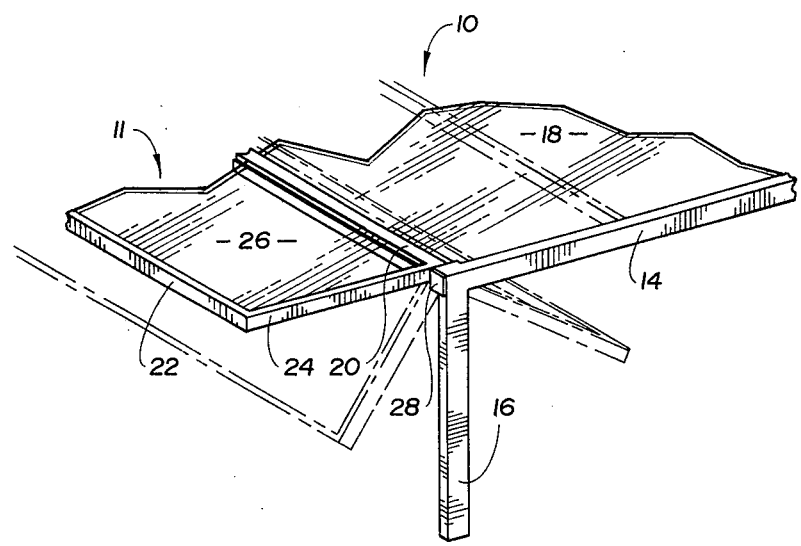
FIG. 3 is a partial view of the table in FIG. 1 and illustrates the pivotal movement of a leaf between its use and storage positions.

An extensible table embodying the present invention is shown generally at 10 in FIGS. 1 through 3. The table 10 has pivotal end leaves 11 which can be moved pivotally between storage positions as shown in FIG. 1 and use positions as shown in FIG. 2.

The table 10 includes a horizontal frame 12 defined by parallel side frame members 14 that are made from tubular steel and have a decorating plating such as hard chrome. The horizontal frame 12 is supported on legs 16 which have their upper ends connected to respective ends of the longitudinal frame members 14. A central table surface or table top 18 is defined by an inlaid sheet of opaque material or transparent material such as a piece of plastic or glass.

Each end leaf 11 is connected to the longitudinal frame members 14 of the horizontal frame 12 by a pair of hinges and is pivotal in both directions between the use position and the storage position as indicated by the phantom views in FIG. 3. Each end leaf 11 includes a frame formed by an inner lateral member 20, an outer lateral member 22, and a pair of side frame members 24 which extend parallel to the longitudinal frame members 14. Each leaf surface 26 is formed by an inlaid sheet of opaque material or transparent material such as a piece of plastic or glass.

At each corner of the horizontal frame 12 is a plate 28. Two of the hinges at opposite diagonal corners are positioning hinges and the plates 28 thereof are connected to locking pins which are operable to respectively lock end leaves 11 in either the use position or storage position. The other two plates 28 are dummy plates which are included for purposes of symmetry.

Figure 4:
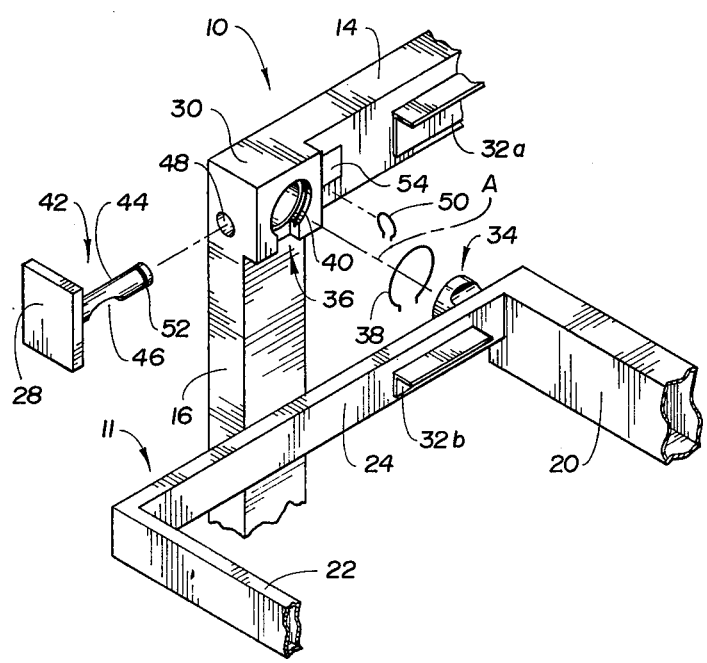
FIG. 4 is an exploded perspective view of one corner of the table of FIG. 1.

Reference is made to FIG. 4 which shows one of the corners of the extended table 10 in exploded perspective relationship to illustrate the hinge construction. As shown therein, the longitudinal frame member 14 is connected to the leg 16 through a corner block 30. This connection has a seamless external appearance which can be obtained from the welding and surface finishing technique described in U.S. Pat. No. 4,109,580 which is incorporated by reference herein. Also, it will be noted that outer member 22 and side frame members 24 are of a smaller size than inner member 20 and are connected thereto away from the hinge axis A so that the leaf 11 assumes a lower position in its inwardly extending storage condition below the table top and assumes an upper position in its use condition coplanar with the table top.

The inlaid sheets forming the central table and leaf surfaces are supported in any suitable manner on the table and leaf frames such as by the partially illustrated L-shaped supports 32a and b shown in FIG. 4. Additional supports that are not shown cooperate with the leaf supports 32b to retain the associated inlaid sheet in the leaf storage position as well as its use position.

Each lateral frame member 20 functions as a lateral end of the horizontal frame 12. More particularly, each frame member 20 is pivotally connected to a respective corner or journal block 30 of the table by a journal 34 which is received within an opening 36 of the block. The connection is secured by a retaining clip 38 which seats in groove 40 in the journal block. Legs of the retaining clip 38 are accessible during assembly through a lower extension of the opening 36 in order to secure the hinge connection as is hereinafter described.

A locking pin 42 is provided to permit locking of an end leaf in either its use position or its storage position. The locking pin 42 includes the corner plate 28 to which is attached a cylindrical shaft 44. A recess 46 in the shaft can be selectively oriented to permit either pivotal movement of the end leaf 11 or locking of the end leaf in one of its positions. The cylindrical shaft 44 is insertable through an aperture 48 extending transversely through the journal block 30. The locking pin 42 has one end that is secured against axial movement by a retainer that includes a snap ring 50 which seats in an annular groove 52 on the shaft 44. An opening 54 is provided in the inner face of the longitudinal frame member 14 to permit affixation of the snap ring 50.

Figure 5A:
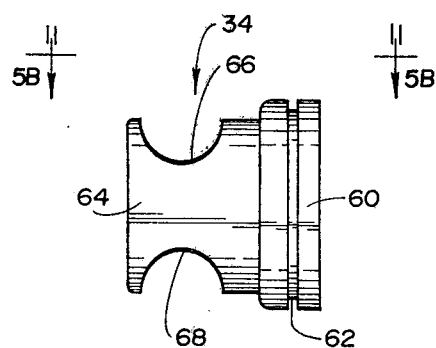
FIGS. 5A, 5B, and 5C are orthogonal views that are respectively taken along the directions of arrows 5A, 5B, and 5C and illustrate a hinge journal of the type which is used to connect the pivotal leaves to the table frame.
Figure 5B:
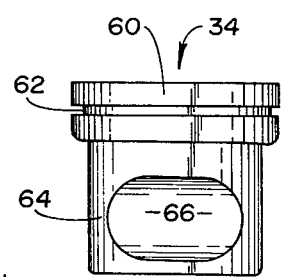
Figure 5C:
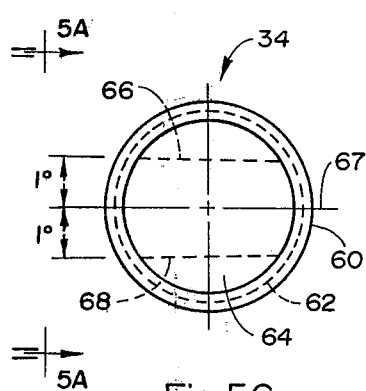

Reference is made to FIGS. 5A through 5C wherein a journal 34 is shown in detached relation from the lateral frame member 20. The journal 34 includes a head portion 60 which is welded to the lateral frame member 20 and a modified cylindrical shaft portion 64. The head portion 60 has a circumferential groove 62 which receives the snap ring 38 shown in FIG. 4. The circumferential groove 62 aligns with the groove 40 in the journal bearing 36. The shaft portion 64 has first and second recesses 66 and 68 formed in substantially diametrically opposed relation. Each of the recesses 66 and 68 is formed as a chordal recess in the cylindrical shaft portion 64 and has a semicircular cross-section. As will hereinafter be described in detail, the grooves 66 and 68 receive the cylindrical shaft 44 of the locking pin 42.

With particular reference to FIG. 5C, it can be seen that the recesses 66 and 68 are oriented at a slight cant of approximately 1° with respect to a horizontal center line 67 passing through the cylindrical shaft portion 64.

The slight cant of the recesses 66 and 68 accommodates for tolerances of the hinges to assure that the surface 26 of each leaf 10 is in coplanar relation with the central table surface 18 when in the use position, and is in parallel planar relation with the central table surface when in the storage position.

Figures 6A, 6B:
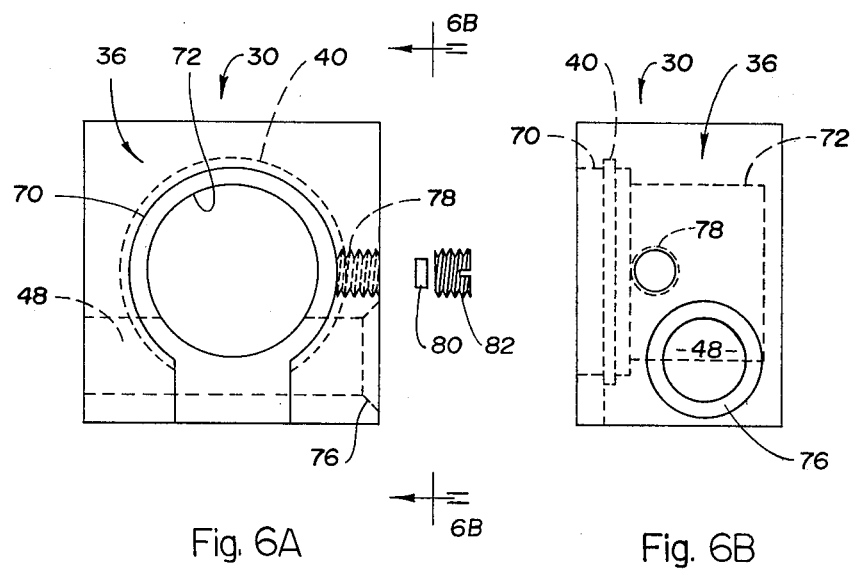
FIGS. 6A and 6B are orthogonal views that are respectively taken along the directions of arrows 6A and 6B and illustrates a hinge journal block which receives the journal shown in FIGS. 5A through 5C.

The corner journal block 30 is shown in orthogonal views in FIGS. 6A and B and is preferably formed of solid metallic material. The journal block opening 36 includes a cylindrical recess 72 which is dimensioned to closely receive the cylindrical shaft 64 of the journal 34. A counterbore 70 is formed concentrically with the cylindrical recess 72 and is dimensioned to receive the head 60 of the journal 34. Circumferential groove 40 is formed in the counter bore 70 to seat the retaining clip 38 shown in FIG. 4. The lower legs of the clip 38 are initially deflected toward each other so as to fully position the clip within journal groove 62 in order to permit insertion of the journal into the journal block. Thereafter the clip legs are released so the clip is received within both grooves to retain the journal in the block. Also, the clip legs can be initially deflected away from each other and received within the block groove 40 as the journal insertion is performed and then released to position the clip in both grooves. Of course, the grooves must be of appropriate sizes to permit each manner of assembly. In either case, the lower extension of opening 36 permits the clip legs to be manipulated for the assembly.

The aperture 48 extends through the journal block 30 in transverse relation to the axis A of hinge pivoting. One end of the aperture 48 is chamfered at 76 to facilitate insertion of the grooved end of locking pin 42 into the block prior to attachment of the clip 50. The plate 28 on the other pin end is normal to the pin axis.

A threaded bore 78 is formed in one side of the corner block 30 and extends transversely with respect to the hinge axis A. The threaded bore 78 receives a plug of brass or another type of soft metal which is secured in the bore by a set screw 82. The plug 80 and set screw 82 are inserted after the journal 34 is received in the journal block 30 and the plug is used as a brake to limit the pivotal speed of the leaf 11 to which the journal is connected.

Figure 7:
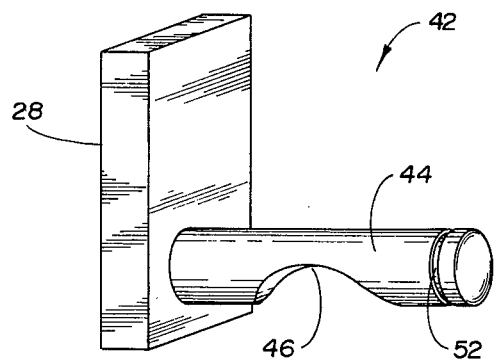
FIG. 7 is a perspective view of a locking pin used to control pivotal movement of the journal

With reference to FIG. 7, the locking pin is shown generally at 42. The locking pin includes the corner plate 28 and a cylindrical shaft 44 extending normally from the surface of the plate. The cylindrical shaft 44 has formed in it a recess 46 which can be selectively oriented within the corner block 30 to permit either pivotal movement of the leaf 11 or to lock the leaf in one or the other of its positions. A circumferential groove 52 receives the snap ring 50 of FIG. 4 which is used to secure the locking pin 42 against axial movement.

Figure 8:
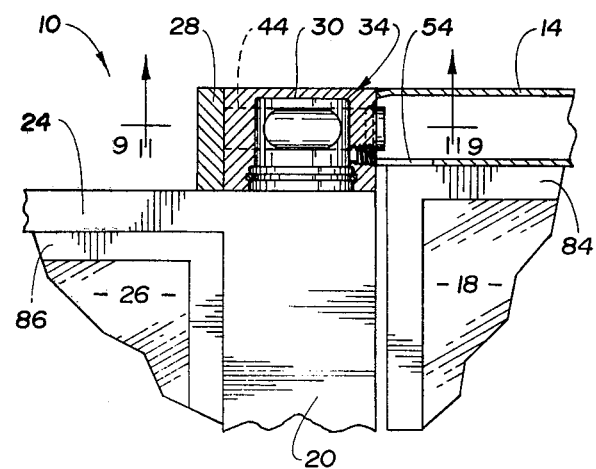
FIG. 8 is a sectional view taken along lines 8—8 of FIG. 2 and illustrates the relation of the journal, journal bearing and locking pin when a pivotal leaf is in its use position.

In FIG. 8, a portion of the corner assembly of the table 10 is shown in pertinent section by the cutting plane defined by lines 8—8 of FIG. 2. Specifically, the table 10 has each of its end leaves extending to its use position such that the leaf surface 26 is substantially coplanar with the central table surface 18.

The inlaid sheet material forming the surfaces 18 and 26 are preferably bordered by respective moldings 84 and 86. These moldings protect against exposure of the edges of the sheet material and add to the aesthetic appearance of the table.

When the end leaf is in its use position, the locking pin 42 is oriented such that the solid portion of the cylindrical shaft 44 is seated within the lower groove 68, FIGS. 5A and C. In this relationship, the journal 34 is prevented against rotating within the corner block 30, FIG. 4.

Figure 9:
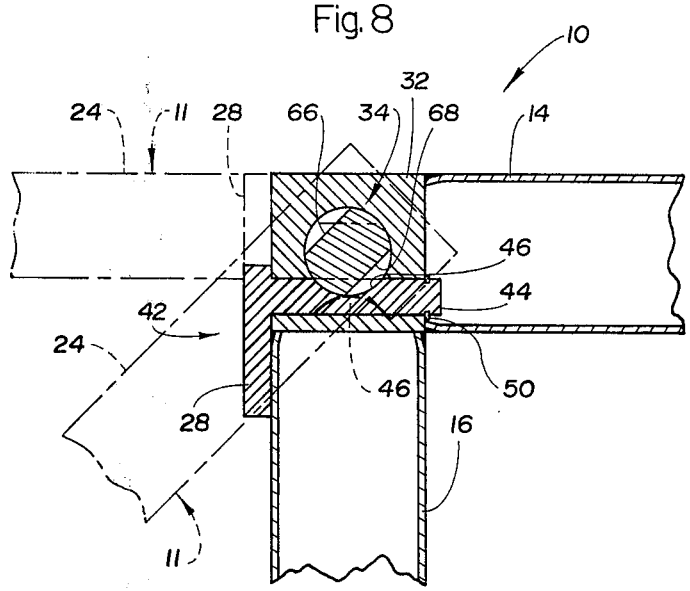
FIG. 9 is a sectional view taken along lines 9—9 of FIG. 8 and illustrates the manner in which the locking pin is rotatable to control pivotal movement of a leaf.

In FIG. 9, the locking pin 42 is shown by the solid lines as being in one position which permits pivotal movement of the end leaf 11, and shown by the phantom lines in another position which locks the end leaf 11 in the use position.

More specifically, the solid lines show the locking pin 42 oriented such that the recess 46 and the cylindrical shaft 44 are oriented upwardly. This orientation of the recess 46 causes it to initially register with the adjacent recess 68 on the journal 34. From this position of initial registry, the journal 34 is thereupon free to pivot to the end leaf 11 in either direction between its use position and its storage position.

Conversely, when the locking pin 42 is oriented such that the recess 46 in the cylindrical shaft 44 is oriented downward, the solid portion of the shaft 44 seats in an adjacent recess in the journal 34 to lock the end leaf 11 in position.

It is apparent from FIG. 9 that the locking pin 42 is free to rotate about the axis of its shaft 44 by manual turning of the corner plate 28, but is secured against axial movement by the snap ring 50.

Also, the manner in which the table is assembled by the retaining clip is preferably incorporated into the leaf hinge mounting but has other uses in assembling perpendicular table frame members. Nevertheless this assembly technique is especially useful for tables having transparent tops whose hinges must be hidden from sight for aesthetics.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

What is claimed is:

1. An extensible table comprising: a horizontal frame including at least one horizontal frame member; a plurality of legs extending downwardly from the frame; at least one pivotal leaf; a positioning hinge for pivotally supporting the leaf for movement between an upper horizontal use position and a lower horizontal storage position; the positioning hinge including a cylindrical journal and a journal block cooperatively extending between the leaf and the frame; the journal block having an opening including a cylindrical recess and a lower opening extension extending downwardly from the recess; the journal being received by the cylindrical recess of the journal block in pivotal relation therein and having a groove extending about the axis of rotation thereof; the journal block also having a groove extending about the axis of rotation of the journal; the groove in the journal being aligned with the groove in the journal block as the journal is received by the journal block; a retaining clip having legs for deflecting the clip so as to be received within one of the grooves in order to permit insertion of the journal into the journal block; said clip legs being received within the downward extension of the journal block opening so as to be accessible but hidden from above; said clip legs being releasable upon alignment of both grooves such that the clip is positioned in both grooves to thereby retain the journal and journal block to each other; the journal also having a pair of generally diametrically opposite chordal recesses; and a locking pin supported by the block and movable so as to selectively be received within one or the other of the chordal recesses in the journal to selectively fix the pivotal relation therebetween in order to pivotally position the leaf in either the use or storage position.

2. The extensible table as in claim 1 wherein the pivotal leaf comprises an end leaf that is pivotal between an outwardly extending use position and an inwardly extending storage position.

3. The extensible table as in claim 1 wherein the locking pin includes a recess formed therein of complementary shape to the journal such that alignment of the locking pin recess with the journal permits pivotal movement of the leaf, and the locking pin being rotatable from a position where the recess thereof is aligned with one or the other chordal recesses of the journal to a position within such journal recess so as to selectively fix the leaf in either the use or storage position.

4. The extensible table as in claim 3 wherein the locking pin and the journal have cylindrical shapes, and wherein each recess in the journal has a semicircular cross-section.

5. The extensible table as in claim 3 or 4 further including a plate attached to one end of the locking pin and disposed in normal relation to the axis of the locking pin.

6. The extensible table as in claim 5 further including a retainer for securing the locking pin against axial movement in the journal block.

7. The extensible table as in claim 6 wherein the retainer includes a groove formed in the locking pin and a snap ring received within the groove and engageable with the journal block to limit axial movement of the locking pin.

8. The extensible table as in claim 1 further including a brake on the journal block for limiting the rate of pivotal leaf movement between the use and storage positions.

* * * * *